US010762641B2

(12) United States Patent
Abdoo et al.

(10) Patent No.: US 10,762,641 B2
(45) Date of Patent: Sep. 1, 2020

(54) INTERACTION RECOGNITION AND ANALYSIS SYSTEM

(71) Applicant: WHIRLPOOL CORPORATION, Benton Harbor, MI (US)

(72) Inventors: Joshua George Abdoo, Stevensville, MI (US); Matthew P. Ebrom, Holland, MI (US); Neomar Giacomini, St. Joseph, MI (US); Donald John Gilmore, Berrien Springs, MI (US); Brian N. Radford, Stevensville, MI (US); Aaron Edward Showers, St. Joseph, MI (US); Collin Andrew Stipe, West Unity, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/195,955

(22) Filed: Nov. 20, 2018

(65) Prior Publication Data

US 2019/0087966 A1 Mar. 21, 2019

Related U.S. Application Data

(63) Continuation-in-part of application No. 15/364,771, filed on Nov. 30, 2016, now Pat. No. 10,157,308.

(51) Int. Cl.
*G06T 7/246* (2017.01)
*G06F 3/16* (2006.01)
*G06K 9/00* (2006.01)

(52) U.S. Cl.
CPC ............. *G06T 7/246* (2017.01); *G06F 3/167* (2013.01); *G06K 9/00* (2013.01); *G06K 9/00362* (2013.01); *G06K 9/00771* (2013.01)

(58) Field of Classification Search
CPC ...... G06T 7/246; G06K 9/00; G06K 9/00771; G06K 9/00362; G06F 3/167
USPC ........................................................ 382/103
See application file for complete search history.

(56) References Cited

U.S. PATENT DOCUMENTS

| 5,689,446 | A  | 11/1997 | Sundman et al. |
| 6,513,017 | B1 | 1/2003  | Howard et al.  |
| 7,444,001 | B2 | 10/2008 | Roberts et al. |
| 7,930,221 | B2 | 4/2011  | Brown et al.   |
| 9,412,086 | B2 | 8/2016  | Morse et al.   |

(Continued)

FOREIGN PATENT DOCUMENTS

| DE | 102014006059 A1 | 3/2015 |
| KR | 20180024265 A   | 3/2018 |

(Continued)

*Primary Examiner* — Jerome Grant, II
(74) *Attorney, Agent, or Firm* — Price Heneveld LLP

(57) ABSTRACT

An object tracking system is disclosed. The system comprises an appliance comprising at least one operating volume and an access region through which the operating volume is accessed. The system further comprises at least one imager and a controller. The controller is operable to detect at least one part of a person's body in the access region based on the image data and identify the object in connection with the part of the person's body. Based on the detection of the object in connection with the person's body, the controller is configured to identify the object. An action is determined for the object based on one or more characteristics of the physical object indicated in the image data.

20 Claims, 12 Drawing Sheets

(56) References Cited

U.S. PATENT DOCUMENTS

| | | |
|---|---|---|
| 9,497,346 B2 | 11/2016 | Baba |
| 9,791,936 B1 | 10/2017 | Kovach |
| 2002/0066279 A1 | 6/2002 | Kiyomatsu |
| 2002/0198795 A1 | 12/2002 | Dorenbosch |
| 2006/0123806 A1 | 6/2006 | Vassilev et al. |
| 2007/0222554 A1 | 9/2007 | Hart |
| 2008/0055084 A1* | 3/2008 | Bodin ............... G06Q 10/08 340/572.1 |
| 2013/0229508 A1 | 9/2013 | Li et al. |
| 2013/0257748 A1 | 10/2013 | Ambrus et al. |
| 2013/0257858 A1 | 10/2013 | Na et al. |
| 2014/0006131 A1 | 1/2014 | Causey et al. |
| 2014/0091690 A1* | 4/2014 | Savage ............... B25H 3/00 312/237 |
| 2015/0002388 A1 | 1/2015 | Weston et al. |
| 2015/0196805 A1 | 7/2015 | Koduri et al. |
| 2015/0253873 A1 | 9/2015 | Sato et al. |
| 2016/0116891 A1 | 4/2016 | Megger et al. |
| 2016/0131418 A1* | 5/2016 | Yang ............... F25D 23/126 222/1 |
| 2016/0179199 A1* | 6/2016 | Levesque ............... G06F 3/011 340/407.2 |
| 2016/0358508 A1 | 12/2016 | Cheatham, III et al. |
| 2017/0071573 A1 | 3/2017 | Takahashi |
| 2017/0155775 A1 | 6/2017 | Sumioka |
| 2017/0208213 A1 | 7/2017 | Miyoshi |
| 2017/0263100 A1* | 9/2017 | Johnston ............... G01N 33/02 |
| 2017/0371405 A1 | 12/2017 | Kwon et al. |
| 2018/0150685 A1 | 5/2018 | Ebrom et al. |
| 2019/0040612 A1* | 2/2019 | Komaki ............... E03C 1/057 |
| 2019/0053012 A1* | 2/2019 | Hill ............... G01S 5/02 |
| 2019/0130180 A1* | 5/2019 | Shiraishi ............... G08B 25/00 |

FOREIGN PATENT DOCUMENTS

| | | |
|---|---|---|
| KR | 20180024654 A | 3/2018 |
| WO | 2013016803 A1 | 2/2013 |
| WO | 2013023951 A1 | 2/2013 |
| WO | 2016202542 A1 | 12/2016 |
| WO | 2017076764 A1 | 5/2017 |
| WO | 2017160499 A2 | 9/2017 |
| WO | 2017223298 A2 | 12/2017 |

* cited by examiner

INTERACTION RECOGNITION AND ANALYSIS SYSTEM

CROSS REFERENCE TO RELATED APPLICATION

This application is a continuation-in-part of U.S. patent application Ser. No. 15/364,771, filed Nov. 30, 2016, and entitled "INTERACTION RECOGNITION AND ANALYSIS SYSTEM," now issued U.S. Pat. No. 10,157,308, the entire disclosure of which is incorporated herein by reference.

BACKGROUND

The present device generally relates to an image based recognition system and more particularly relates to an image based recognition system for an appliance.

SUMMARY

In at least one aspect, an object tracking system is disclosed. The system can comprise an appliance comprising at least one operating volume and an access region through which the operating volume is accessed, at least one imager configured to capture image data in a field of view comprising the access region, and a controller in communication with the imager. The controller is operable to detect at least one part of a person's body in the access region based on the image data, identify a physical object in connection with the part of the person's body, and based on the identification of the physical object in connection with the part of the person's body, determine an action for the physical object based on one or more characteristics of the physical object indicated in the image data.

In at least another aspect, a method of tracking an object utilized in connection with an appliance is disclosed. The method comprises capturing image data in an access region adjacent to an operating volume of the appliance, detecting at least one part of a person's body in the access region of the operating volume based on the image data, determining an action for the object in connection with part of the person's body based on one or more characteristics of the object indicated in the image data, and in response to determining an action for the object, initiating the action to provide feedback to the user relating to the object in the access region.

In at least another aspect, an object tracking system is disclosed. The system comprises an appliance comprising at least one operating volume and an access region through which the operating volume is accessed, at least one imager configured to capture image data in a field of view comprising the access region, and a controller in communication with the imager. The controller is operable to detect at least one part of a person's body entering or exiting the access region based on the image data, identify an object in connection with the part of the person's body upon entering or exiting the operating volume based on the image data, and initiate an advanced interaction for the object in response to the entering or exiting based on one or more characteristics of the object indicated in the image data wherein the advanced interaction provides feedback to the user relating to the object.

These and other features, advantages, and objects of the present device will be further understood and appreciated by those skilled in the art upon studying the following specification, claims, and appended drawings.

DETAILED DESCRIPTION OF EMBODIMENTS

Figure 1:
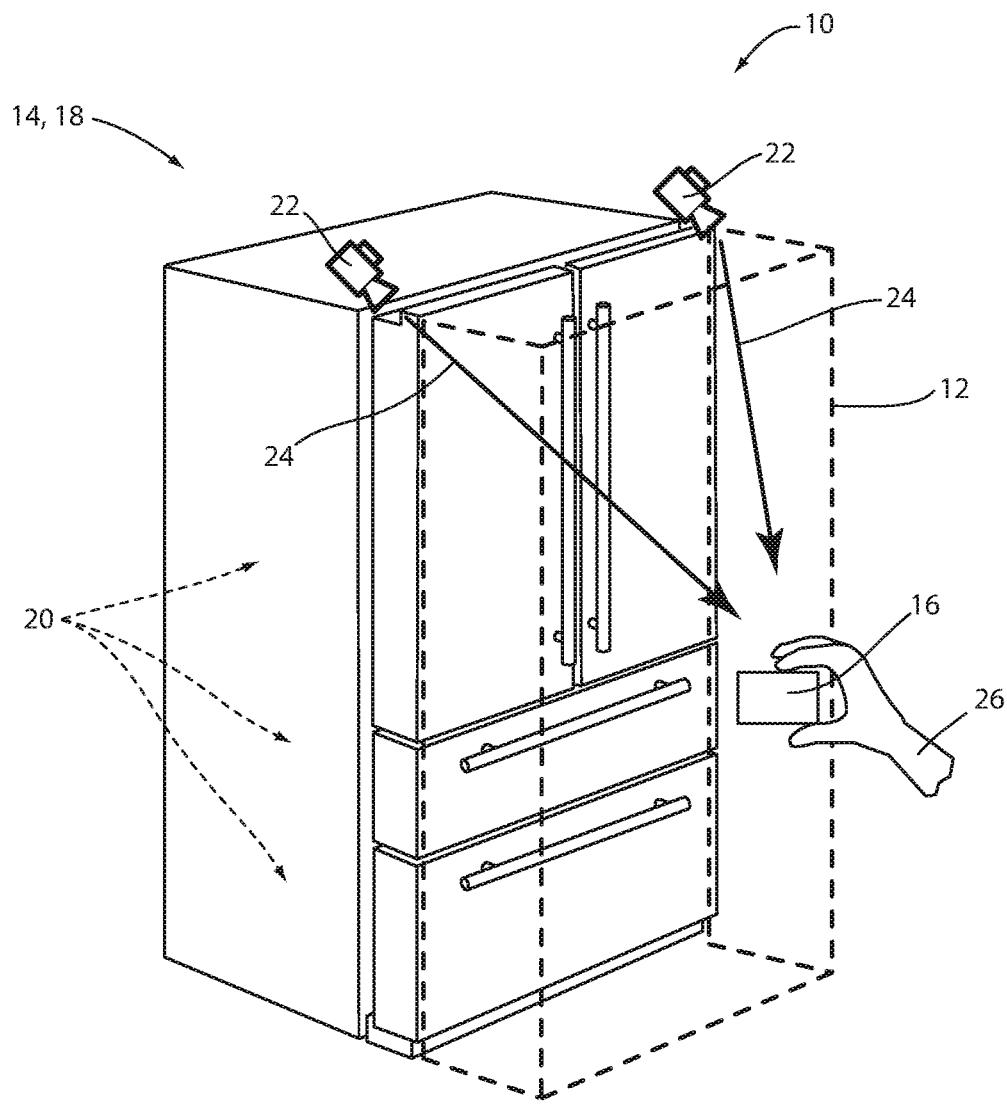
FIG. 1 is a projected view of an interaction recognition system of an appliance.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIG. 1, an interaction recognition system 10 is shown configured to monitor an access region 12 of an appliance 14. The interaction recognition system 10 may be configured to recognize and track a status of an object 16 utilized in connection with the appliance 14. The specific status of the object 16 tracked or updated by the system 10 may vary depending on the nature of the appliance 14. For example, if the appliance 14 corresponds to a storage system, the system 10 may track an inventory. If the appliance 14 corresponds to a washing system, the system 10 may identify one or more objects to be washed and a clean or dirty status of the objects. The specific examples discussed herein are further detailed throughout the following description. Accordingly, the disclosure may provide for an interaction recognition system 10 that may be utilized to recognize the status of an object, inventory of an object, and/or various processing states to gather and track various information as discussed herein.

For example, if the appliance corresponds to a storage system, such as a refrigerator 18, the system 10 may be configured to track an inventory of the object 16 as it is added or removed from an operating volume 20 or cavity of the refrigerator 18. In order to detect and identify the object 16, the interaction recognition system 10 may comprise at least one imaging device 22. In some embodiments, the at least one imaging device 22 may correspond to a plurality of imaging devices 22. The at least one imaging device 22 may be configured to capture image data in a field of view 24 including the access region 12. The interaction recognition system 10 may be operable to detect the object 16 in connection with at least one part of a person's body (e.g. a hand 26) in connection with the object 16 entering and/or exiting the operating volume 20 via the access region 12. In this way, the system 10 may be operable to track the status of the object 16 by detecting the part of the person's body as it enters and exits the access region 12.

As discussed herein, the at least one part of a person's body may correspond to the hand 26, more than one hand, a portion of an appendage, which may correspond to an obstructed hand 26, or various other portions of a person's body. For clarity, such portions of a person's body will be referred to as the hand 26 hereinafter. Accordingly, in various embodiments as discussed herein, the system 10 may be configured to detect activity of the hand 26 from image data captured by the at least one imaging device 22 in the field of view 24. In this way, the system 10 may identify a status of the object 16 in connection with the hand 26 and/or identify whether or not the hand 26 is in connection with the object 16 as it enters or exits the access region 12 of the appliance 14. By focusing on the hand 26 or part of the person's body, the system 10 may not only directly identify a status of the object 16 from the image data, but may also infer or deduce a status of the object 16 based on the activity of the hand 26 identified during a temporal period proximate to an identification of the object 16 in connection with the hand 26. Such inferences or deductions are further discussed in reference to FIGS. 3, 4, and 6.

The object 16 may generally correspond to any form of object that may be stored, processed, disposed of, or otherwise utilized in connection with an appliance 14. For example, the object 16 may correspond to a food product that may be stored in the operating volume 20 of the refrigerator 18. As the object 16 passes through the access region 12 in connection with the hand 26, the system 10 may process image data captured by the at least one imaging device 22 in order to identify a product type and proportion or quantity by utilizing various imaging processing techniques. With the product type and quantity identified for the object 16, the system 10 may update an inventory status of the product type and quantity of the object 16 in a memory or inventory database. In this way, the system 10 may be operable to track an inventory status of the object 16 based on the activity of the hand 26 indicated in the image data captured by the imaging device 22. Though discussed in reference to an inventory status, the system 10 may be configured to detect various forms of information in reference to the object 16, which may include but are not limited to, a cooking status, a depletion or usage, a clean/dirty status, a color or consistency, and/or various additional information that may be derived from the image data. Accordingly, the system 10 may be configured not only to track an inventory status, but to also track usage and automatically select one or more processing methods or cycles to be applied to the object 16 by the appliance 14.

For example, if the appliance 14 corresponds to a laundry washer, the interaction recognition system 10 may be configured to detect one or more characteristics of the object 16 in the form of articles of laundry. The one or more characteristics may be identified by the system 10 based on image data captured by the imaging device 22 in the field of view 24 based on the objects passing through the field of view in the access region 12 in connection with the hand 26. Accordingly, the laundry washer may be configured to detect that the object 16 corresponds to a dirty towel and automatically set the appliance to a specific washing cycle for towels. Similarly, if the appliance 14 corresponds to an oven, the detection of a whole chicken in the image data being added to the operating volume 20 (e.g. the oven cavity) via the access region 12 may trigger the system 10 to enable an automatic selection of a roasting cooking method for the object 16. In addition, if multiple cooking methods were available to a user for the object 16 (baked vs. roast turkey), those choices could also be made available to the user via a user interface of the appliance 14.

In some embodiments, the system 10 may be operable to track various forms of information regarding the status and characteristics of the object 16. As discussed herein, such information may be inferred by the system 10 based on a process completed by the appliance 14 and/or a duration of time between a first detection of the object 16 and a second detection of the object 16 (e.g. a time between removal and placement of the object in the operating volume 20). Such information may include clock and calendar data for inventory and quality tracking of the object 16. Additionally, the status of the object 16 may be indicated based on a actions taken on the object including, but not limited to wrapping the object 16, opening a package containing the object, covering a surface or container of the object, etc.

Figure 2B:
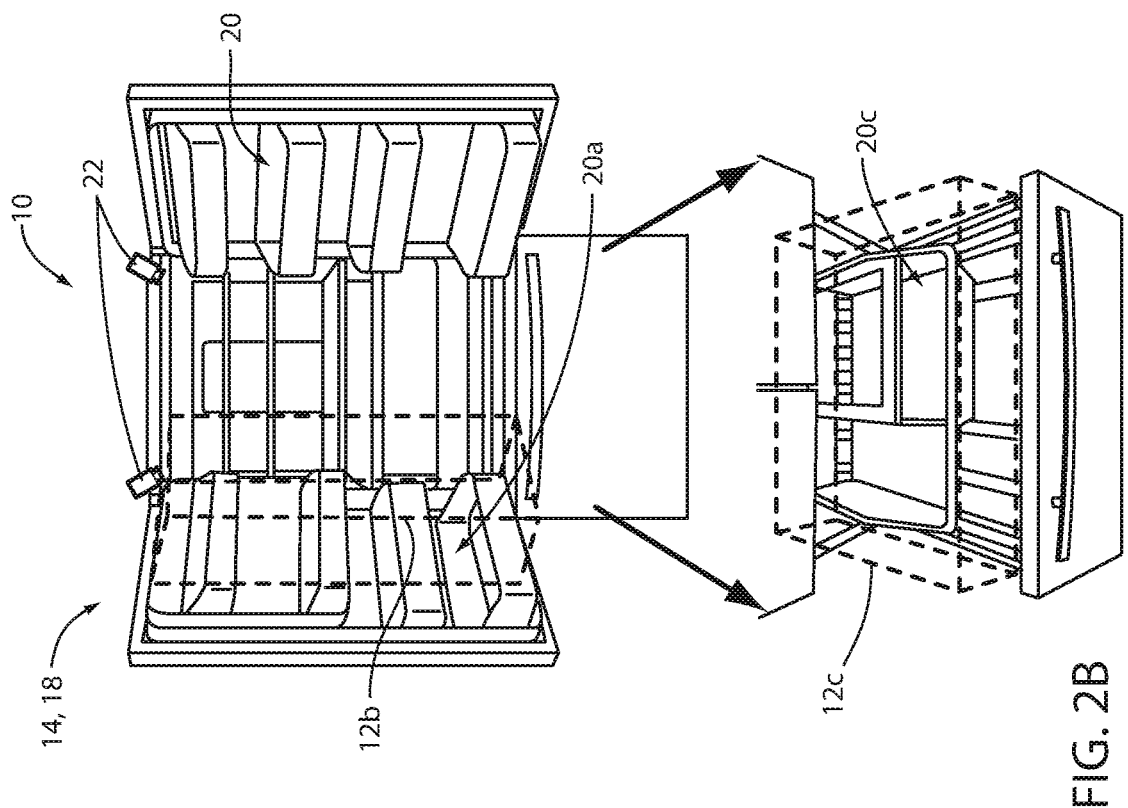
FIG. 2B is a projected view of an appliance comprising an interaction recognition system configured to monitor a plurality of access regions.
Figure 2A:
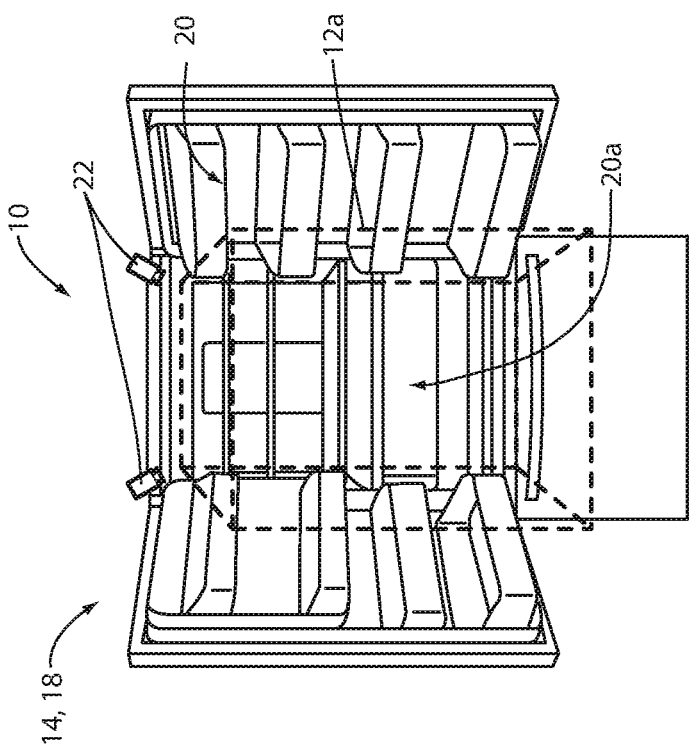
FIG. 2A is a projected view of an access region of an appliance monitored by an interaction recognition system.

Referring now to FIGS. 2A and 2B, the interaction recognition system 10 is demonstrated utilized in combination with an exemplary embodiment of the refrigerator 18. Though the interaction recognition system 10 is described in reference to a variety of exemplarily appliances 14 or operating volumes/regions, like reference numerals are utilized to describe like or similar elements for clarity. As demonstrated in FIGS. 2A and 2B, the interaction recognition system 10 may be configured to capture image data in a plurality of access regions 12, which may correspond to a plurality of operating volumes 20 or cavities of the refrigerator 18. Common examples of these cavities could include refrigerator pantry drawers, freezer drawers, or extendible shelves that can be pulled out of the cavity and into the access region. In this way, the system 10 may be operable to identify activity of the hand 26 entering and exiting each of the operating volumes 20 and track a status and/or location of the object 16 in connection with the hand 26 in each of the operating volumes 20.

For example, the system 10 may be configured to monitor a first access region 12a, which may correspond to central operating volume 20a (e.g. a fresh food storage volume) of the refrigerator 18. The system 10 may further be operable to monitor a second access region 12b through which the hand 26 may pass to reach a second operating volume 20b (e.g. a door storage volume). The system 10 may further be operable to monitor a third access region 12c through which the hand 26 may pass to access a third operating volume 20c (e.g. a freezer cavity or freezer drawer). Accordingly, the interaction recognition system 10 may be configured to monitor an interaction of the hand 26 in connection with the object 16 within each of a plurality of access regions 12. In this way, the system 10 may identify a location of the object 16 within a particular operating volume (e.g. the first, second, etc.) of the appliance 14 and include the location as a component of the inventory status or general status of the object 16 in a memory or database. The imagers 22 monitoring access region 12a may or may not be the same imagers used to monitor access region 12c.

Figure 3A:
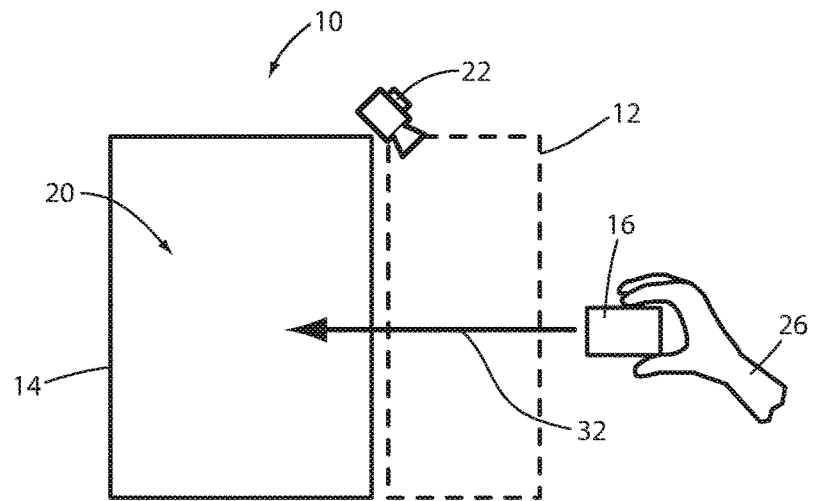
FIG. 3A is a schematic diagram demonstrating an interaction recognition process.
Figure 3B:
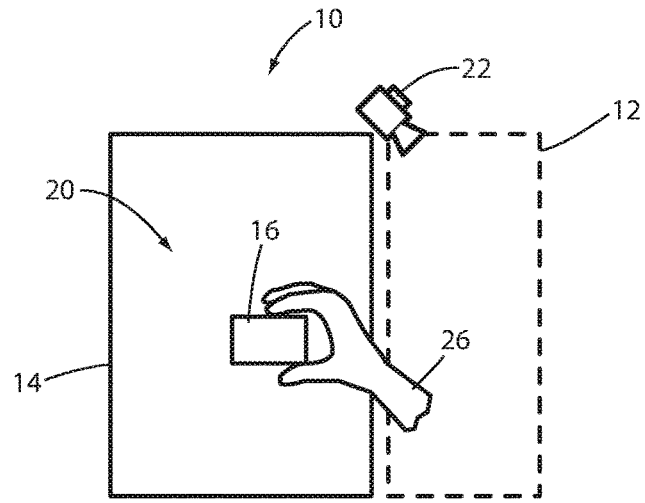
FIG. 3B is a schematic diagram demonstrating an interaction recognition process.
Figure 3C:
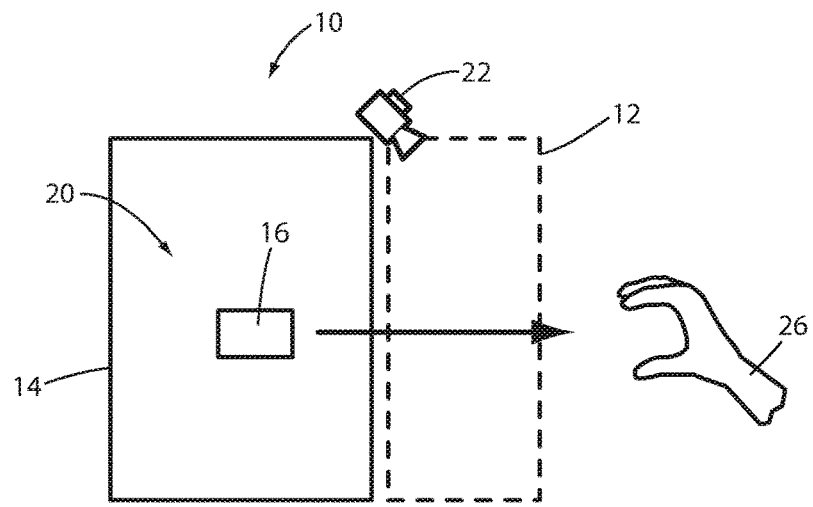
FIG. 3C is a schematic diagram demonstrating an interaction recognition process.

Referring now to FIGS. 3A, 3B, and 3C; a method of tracking a status of the object based on an interaction of the hand 26 identified in the access region 12 is shown. The particular example demonstrated in reference to FIG. 3 may correspond to a detection of the object 16 being inserted or placed in the operating volume 20. In response to the insertion of the object 16 into the operating volume 20, the system 10 may record and update a status of the object 16 indicating the placement of the object 16 within the operating volume 20. Such a status may indicate that the object 16 is undergoing one or more of a variety of processes which may include, but are not limited to, a heating process, a cooling process, a cooking process, a cleaning process, a preservation process, a disposal process, or a variety of processes that may occur within the operating volume 20. Accordingly, the operating volume 20 may correspond to a variety of appliances 14 or work areas including, but not limited to, conventional ovens, microwave ovens, refrigerators, freezers, waste disposal units, laundry machines, dishwashers, pantries, cabinets and drawers, work surfaces, trash receptacles, and similar work spaces some of which may be external to appliances, various appliances, or receptacles. In this way, the system 10 may be utilized to track a status of various objects that may be processed, stored, and/or disposed of in the various appliances, work surfaces, and/or receptacles as discussed herein.

In FIG. 3A, the hand 26 is shown in connection with the object 16. As demonstrated by the arrow, the hand 26 may pass through the access region 12 in order to access the operating volume 20 of the appliance 14. As the hand passes through the access region 12, the imaging device 22 may capture image data in a field of view 24 identifying the hand 26 in connection with the object 16. Based on the image data, the system 10 may identify the object. The identification of the object 16 may include an indication of a type or category to which the object 16 belongs and a proportion or quantity of the object 16. The system 10 may further identify additional information about the object 16, including, but not limited to, a color, a texture, a storage data, a location, and various additional information. In some embodiments, the system 10 may classify the object 16 into classes and subclasses. For example, in the case where the object 16 is a food product, the system 10 can determine a class of the object 16 as a beverage, a protein, a fruit, a vegetable, a packaged industrial food, a dressing, and the like. A subclass of a beverage may include a can, a bottle, a box, and the like, while a subclass of a protein may include a type, such as chicken, beef, fish, a state, such as frozen or fresh, and/or a size.

Although not depicted in FIG. 3A, the object 16 may also be placed on a rack, drawer, or bin that is temporarily extended away from the operating volume 20 and extended into the access region 12. The extended rack, drawer, or bin is then moved back into the operating volume 20 along with the recognized object 16. An example of this may include a food item being placed on an oven rack. The rack is temporarily extended in the access region outside of the cavity and then inserted together with the food item back into the oven cavity for cooking.

FIG. 3B demonstrates the hand 26 located within the operating volume 20 of the appliance 14. In response to the hand 26 located within the operating volume 20, the system 10 may process the image data from the imaging device 22 to indicate a temporal period during which the object 16 and the hand 26 have passed through the field of view 24 into the operating volume 20. In FIG. 3C, the hand 26 is shown removed from the operating volume 20 and having passed through the access region 12 without the object 16. In response to the hand 26 being identified as having been withdrawn from the operating volume 20 via the access region 12 without the object 16, the system 10 may infer that the object 16 has been inserted into the operating volume 20. In this way, the system may identify that the object 16 has been placed within the operating volume 20 for storage, processing, disposal, and/or consumption, etc.

Figure 4A:
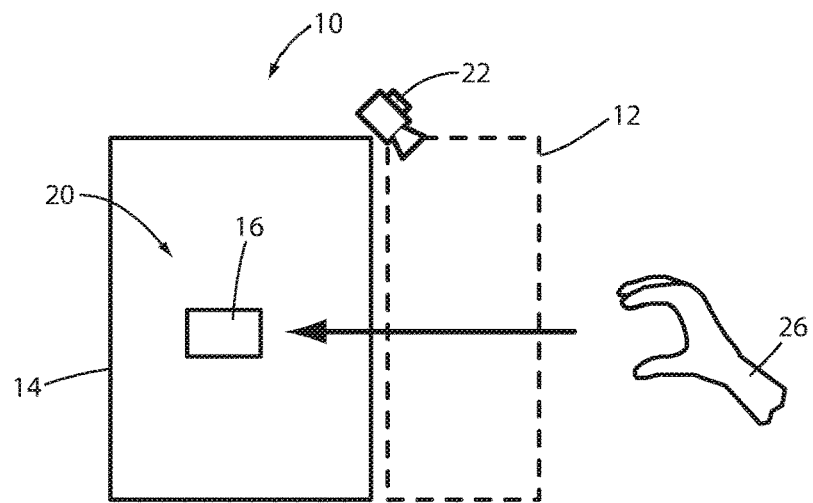
FIG. 4A is a schematic diagram demonstrating an interaction recognition process.
Figure 4B:
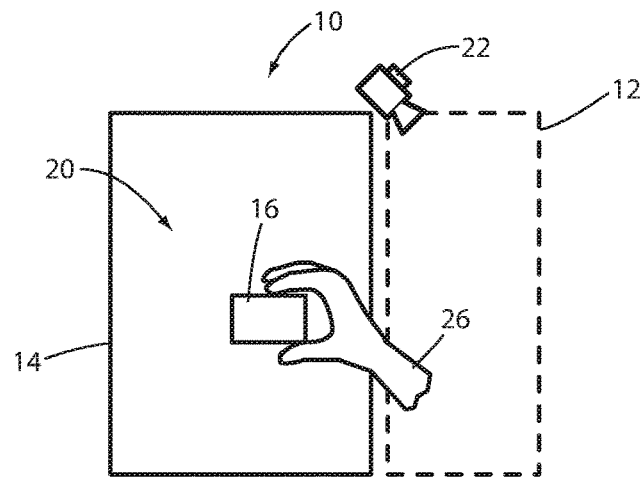
FIG. 4B is a schematic diagram demonstrating an interaction recognition process.
Figure 4C:
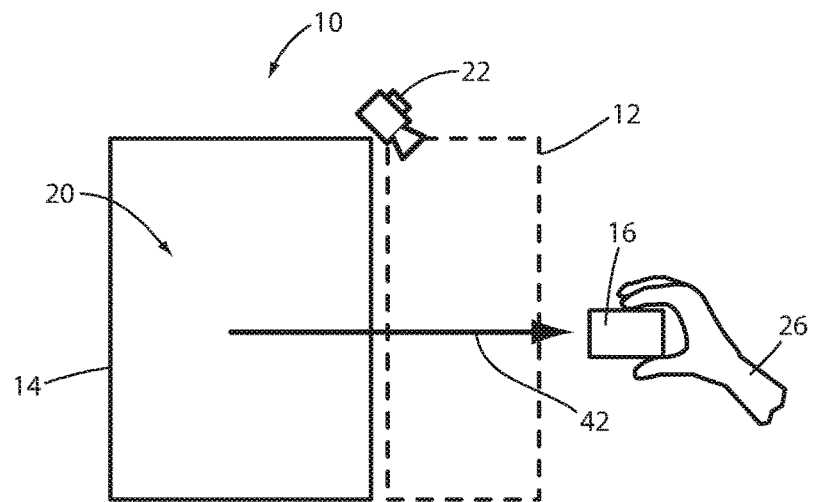
FIG. 4C is a schematic diagram demonstrating an interaction recognition process.

Referring to FIGS. 4A, 4B, and 4C; a method for tracking a removal of the object 16 with the interaction recognition system 10 is shown. Similar to the method described in reference to FIG. 3, the system 10 may be configured to monitor and process imaging data recorded by the imaging device 22 to identify an interaction of the hand 26 entering or exiting the operating volume 20. FIG. 4A demonstrates the hand 26 passing through the access region 12 to access the operating volume 20. Note that as the hand 26 enters and passes through the access region 12, the system 10 may identify that the object 16 is not in connection with the hand 26.

In FIG. 4B, the hand is shown having passed through the access region 12 and into the operating volume 20. In FIG. 4C, the hand 26 is shown in connection with the object 16 being withdrawn from the operating volume 20 through the access region 12. Accordingly, based on the detection in the image data from the imaging device 22 of the hand 26 entering the operating volume 20 through the access region 12 without the object 16 and exiting the operating volume 20 via the access region 12 in connection with the object 16, the system 10 may process the image data to determine that the object 16 has been withdrawn from the operating volume 20. Upon identification of the object 16 being withdrawn from the operating volume 20, the system 10 may update the status of the object 16 accordingly.

Referring now to FIGS. 3A and 4C, the system 10 may be operable to detect and update the status of the object 16 based on a variety of properties and/or characteristics that may be identified in the image data received from the imaging device 22. Such properties and/or characteristics may be identified based on the operations or processes completed by the appliance 14. For example, as previously discussed, an identification of the object 16 in connection with the hand 26 being inserted or removed from the operating volume 20 of the refrigerator 18 may be utilized by the system 10 to update an inventory of the object 16. Additionally, one or more properties may be identified upon an insertion 32 of the object 16 (FIG. 3A) and/or upon a removal 42 of the objects 16 (FIG. 4C). In this way, the system 10 may track a variety of properties and/or characteristics corresponding to the object 16 based on the image data captured by the imaging device 22 as the object 16 is moved by the hand 26 through the access region 12.

For example, upon detection of the insertion 32 of the object 16 into the operating volume 20, the system 10 may detect an identity, color, surface texture, quantity, proportion, or any form of information that may be visually and/or thermally detected by the system 10 based on the image data received from the imaging device 22. Similarly, the system 10 may detect such properties and/or characteristics of the object 16 upon the removal 42. In this way, the system 10 may draw various inferences regarding the status of the object 16 based on the image data corresponding to the insertion 32 and/or the removal 42. Additionally, such inferences may be determined by the system 10 based on the process that may occur in the operating volume 20 of the appliance 14 between a timing of the insertion 32 and a timing of the removal 42. In some scenarios, the system 10 may also infer information about the object 16 based on a duration of time that the object is detected as being removed from the operating volume 20.

The inferences regarding the properties and/or characteristics of the object 16 that may be determined by the system 10 may be dependent upon or determined in relation to the type of appliance 14 and process occurring within the operating volume 20. Accordingly, a controller of the system 10 may be in communication with an appliance control system to determine a process that may be completed between the insertion 32 and the removal 42 of the object 16 or vice-versa. For example, if the appliance corresponds to a cooking device, the system 10 may receive process information, which may include a cooking time and cooking power or temperature from the appliance controller. Based on the process information, in addition to the properties and/or characteristics identified from the image data, the system 10 may identify a level of doneness for a cooking status of the object 16 from the image data. That is, if the object 16 corresponds to a food item (e.g. a meat, vegetable, etc.), the system 10 may utilize a combination of the process information from the appliance controller as well as a color or surface texture of the object 16 from the image data to determine a cook quality for level of preparation of the object 16.

In some embodiments, the system 10 may trigger or deactivate one or more timers to start either to shut-off one or more processes completed by the appliance 14. Additionally, the system 10 may be configured to record or infer information regarding the object based on the time period spent within or outside the operating volume 20. For example, based on the process occurring within the operating volume 20 of the appliance 14, the system 10 may record and/or display a cooking time log indicating a status of the object and/or a cooking process related to the object 16.

Furthermore, the system 10 may determine an action for the object 16 based on one or more properties and/or characteristics identified from the image data. The controller of the system 10 may be configured to identify the image by utilizing an object identification module and determine the appropriate action. An action can be in the form of an advanced interaction or an instruction from the system 10 to provide assistance and/or feedback to the user relating to the object 16 in response to the object 16 entering or exiting the operating volume 20. An object detection module may detect the object 16 entering or exiting the operating volume 20. An action from the system 10 may include a voice message and/or selective lighting. Examples of selective lighting include, but are not limited to, a light spot on the object 16, a light color on the object 16, pulsing light, dimming light, or lighting a specific zone. In addition to providing feedback to the user relating to the object 16, the controller of the system 10 can be configured to determine an input from the user in response to the feedback or action. Input from the user may be in the form of a gesture, a vocal communication, or any suitable haptic command. The system 10 may initiate more than one action such that the user can respond to each action with an input, and a dialogue between the system 10 and the user can be maintained. However, an action may not require input from the user in response to the action where the action is configured as an instruction or indication rather than an inquiry or a prompt to the user.

Figure 4D:
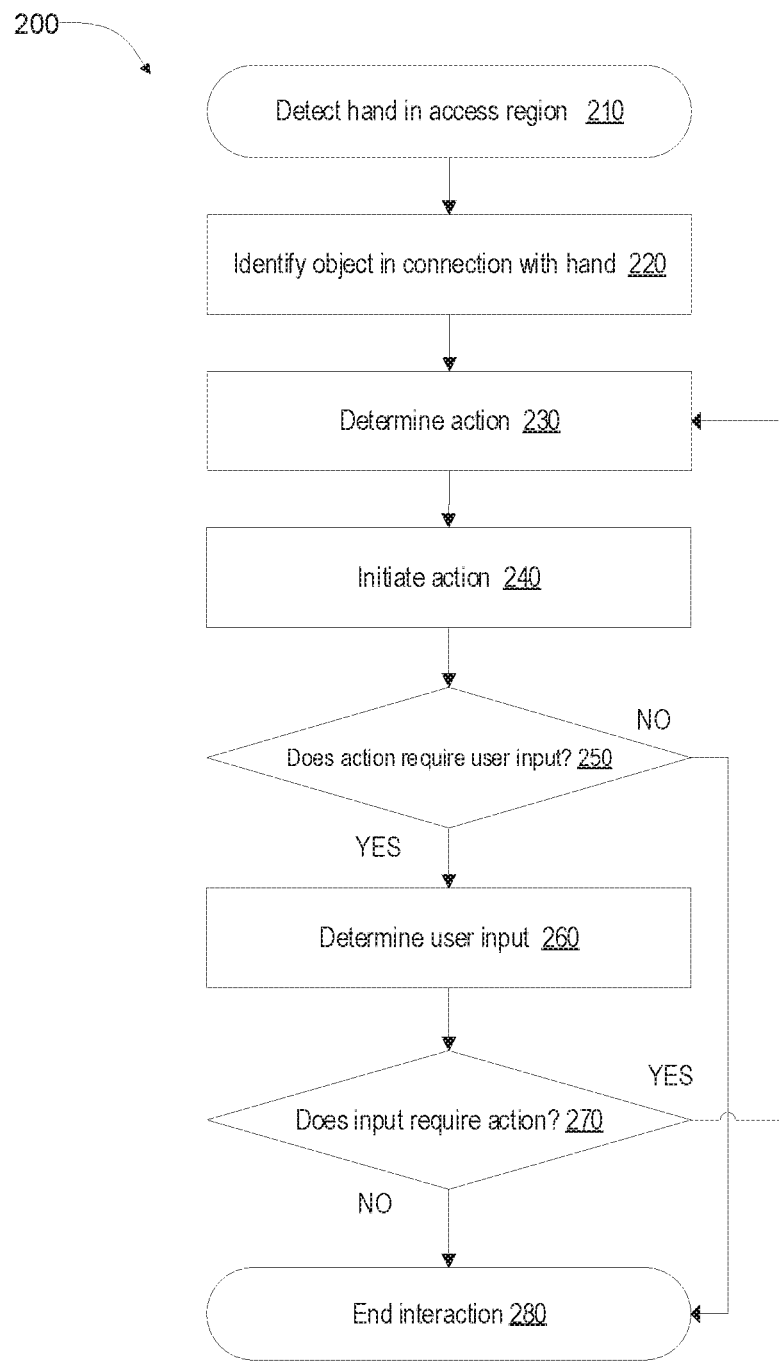
FIG. 4D is a flow chart demonstrating an interaction recognition process.

FIG. 4D illustrates a flow chart demonstrating an interaction recognition process 200. The process 200 may begin at step 210 when a hand passes through the access region 12, the imaging device 22 captures image data in a field of view 24 and the object detection module may detect the hand 26 in connection with the object 16. At step 220, the object identification module of the system 10 may identify the object 16 in connection with the hand based on the image data. The identification at step 220 can include classifying the object 16 into classes and subclasses. At step 230, the controller of the system 10 can determine an action for the object 16 based on the identification at step 220. The action can be initiated by the system 10 at step 240, which can be followed by a decision step 250 where the controller of system 10 may decide if the action requires user input. If the action does not require user input, the interaction process 200 can end at step 280. If the action does require user input, the system 10 can determine the user input at step 260. Following the determination of the user input at step 260, the system 10 can make a decision at step 270 on whether an action is required as a response to the user input. If the user input does not require an action, the interaction process 200 can end at step 280. If the user input does require an action, the process 200 can return to step 230 to determine an action.

In some examples, an action may relate to guiding the user for storage of the object 16. For example, the system 10 can identify the object 16 such that the object 16 is classified as a fruit and further classified as a papaya. The system 10 can determine that the optimal storage location for the papaya is in a low-humidity drawer. The system 10 may then initiate an action that can include selective lighting of at least a portion of the appliance 14, such as a drawer or shelf, to provide an indication of the optimal storage location for the papaya, or object 16. Alternatively, the action may include a voice message stating, "Store the papaya in the bottom, right drawer."

In another example, an action may relate to recipes for the object 16 which can include but are not limited to: suggesting recipes for the object 16, providing information regarding other stored ingredients for a recipe related to the object 16, or providing information on the sufficiency of the object 16 for a recipe. For example, the system 10 may initiate an action that includes a voice message prompting the user, "What do you want to do with that cheese?" The user can respond to the system 10 with a vocal communication such as, "suggest a recipe." The system 10 can determine the input from the user and initiate another action that can include a voice message stating, "That cheese would be perfect for fondue." The recipe can be communicated to the user in any suitable manner such as displaying the recipe on the appliance 14 display or sending the recipe to a smart device.

While actions by the system 10 have been described in relation to storage or recipes for the object 16, the system 10 can determine and initiate actions for an object 16 to provide assistance to the user relating to the object 16 using a variety of determined characteristics. In further examples, the system 10 can take into account the status of the object 16, which can include a depletion/usage for the object 16. As the system 10 is configured to interact with the user based on the object 16 entering or exiting the operating volume 20, the action(s) determined and initiated by the system 10 are based on the point-of-use for the object 16 such that the system 10 may interact with the user in real-time.

Figure 5B:
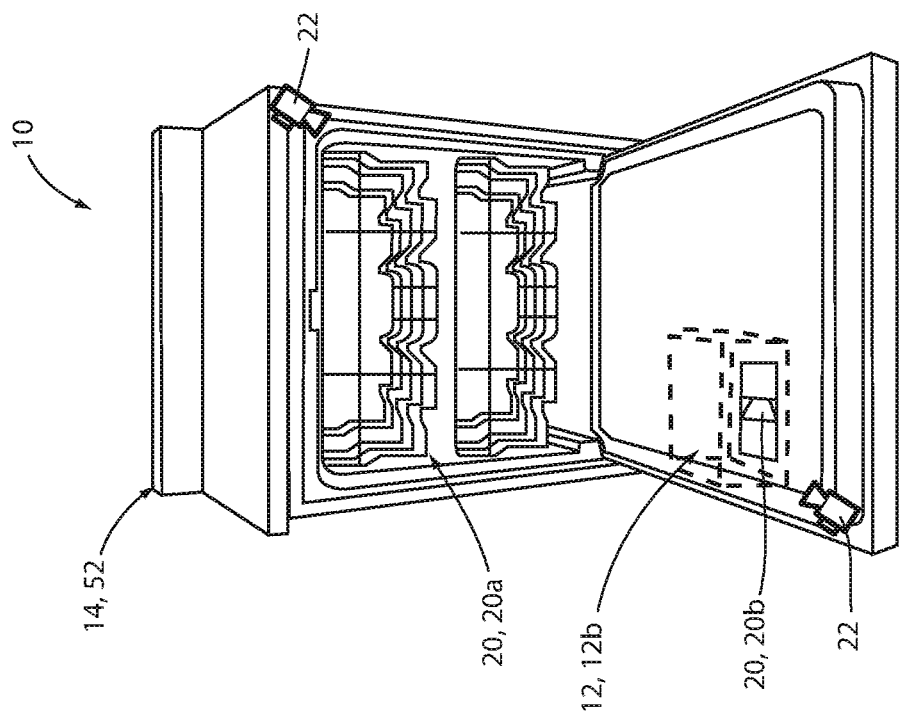
FIG. 5B is a projected view of an appliance demonstrating an interaction recognition system.
Figure 5A:
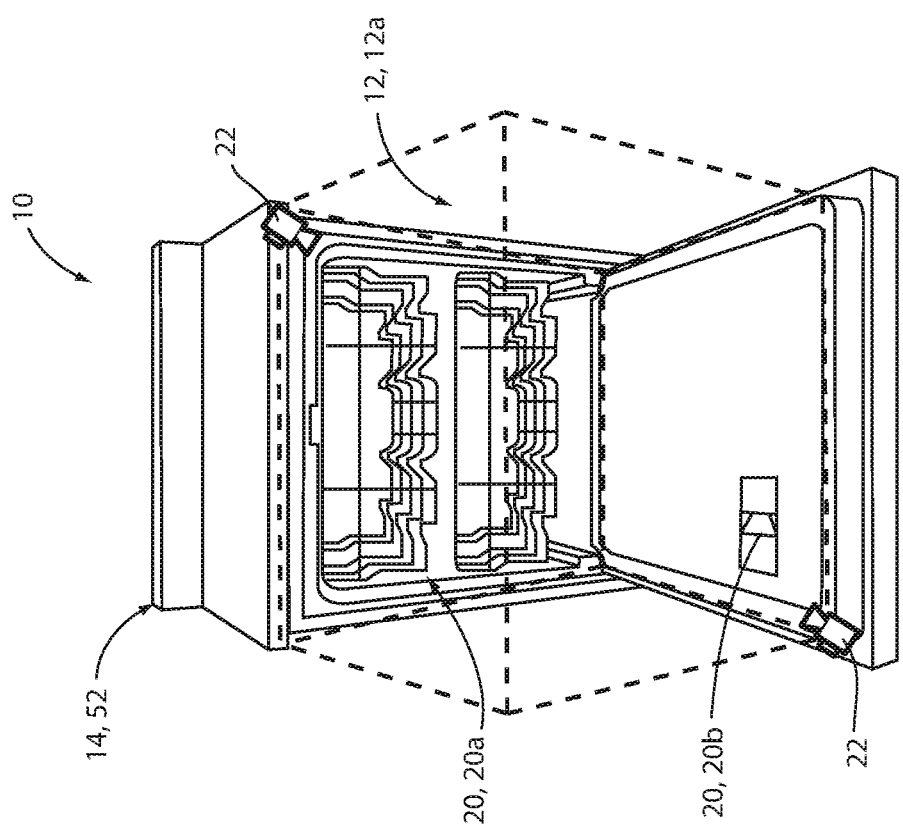
FIG. 5A is a projected view of an appliance demonstrating an interaction recognition system.

Referring now to FIGS. 5A and 5B, the interaction recognition system 10 is shown implemented with a dishwasher 52. The interaction recognition system 10 may be configured to monitor at least one access region 12 that may correspond to a volumetric space through which the hand 26 may travel to reach the operating volume 20. In this configuration, the system 10 may be operable to detect the status of an object 16 (e.g. a dish, utensil, etc.) upon a detection of the insertion 32. In this way, the system 10 may utilize the image data captured by the at least one imaging device 22 to identify the insertion 32 of the object 16 as well as identify a type of article (e.g. plate, utensil, container, etc.) corresponding to the object 16. The system 10 may identify a status of the object 16 and identify a specific type or identity corresponding to the object 16 upon the insertion 32 into the operating volume 20 of the dishwasher 52. Based on the status and identity of the object 16, the system 10 may be operable to instruct the appliance controller of the dishwasher 52 to select a specific wash cycle, temperature, and additional processing information to control the operation of the dishwasher 52 in response to the image data gathered including the object 16. An additional piece of status information may include absolute location or even relative location to other items. For example, when an object 16 (e.g. a dish) is placed in an operating volume 20 (e.g. a dishwasher rack) extended into the access region 12, the system can track the location of the dish before the rack is returned to the operating volume 20. The relative location of different objects 16 (e.g. dishes) to one another can also be tracked to create a full view of how the dishes have been loaded into a dishwasher.

In some embodiments, the interaction recognition system 10 may be operable to monitor a first access region 12a for the insertion 32 and/or removal 42 of a first type of object. Additionally, the system 10 may monitor a second access region 12b for the insertion 32 and/or removal 42 of a second type of object. The first type of object may correspond to a reusable object that may be processed by the appliance 14. In the example of FIG. 5, the reusable object may correspond to a dish, utensil, container, or various objects that may be processed within the operating volume 20 of the dishwasher 52. In reference to the second access region 12, the system 10 may monitor the image data captured by the imaging device 22 to detect a second type of object that may correspond to a consumable object or disposable object.

In the exemplary embodiment, the consumable object or disposable object may be identified by the system 10 in response to the insertion 32 into a second operating volume 20b (e.g. a detergent reservoir). Again, the insertion 32 may be detected by the system 10 in response to detecting the hand 26 in connection with the object 16 passing through the second access region 12b and into the second operating volume 20b. In response to the detection of the insertion 32 of the object 16 into the second operating volume 20b, the system 10 may update an inventory of a detergent (e.g. a liquid, powder, pod, etc.) to account for the consumption of the detergent by the dishwasher 52. In this way, the system 10 may update a status or a usage of both reusable objects and consumable objects to provide a variety of beneficial functions to track inventory, statuses, and/or consumption of various objects as discussed herein.

For example, the type of detergent added to the appliance 14, in this case the dishwasher, or other properties such as liquid, powder, or capsule could be detected from the image data as well. Specifically, with consumables such as detergent, the entire object connected to the hand 26 in the access region 12 may not be placed in the operating volume 20. Instead, there may be a container that is partially emptied into the operating volume 20 and then removed by the user without ever leaving the attachment with the hand 26. An example of this would be pouring a jug of liquid or gel detergent into a dishwasher dispenser cavity. In such an example, based on a typical usage of the consumable in the operating volume 20, the system 10 may infer and update the status of the object (e.g. the remaining detergent).

Figure 6A:
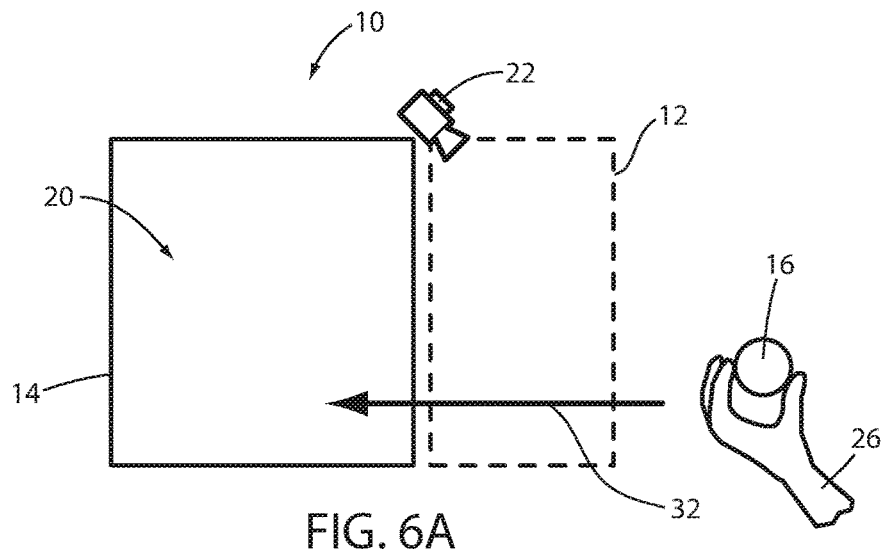
FIG. 6A is a schematic diagram demonstrating an interaction recognition process.
Figure 6B:
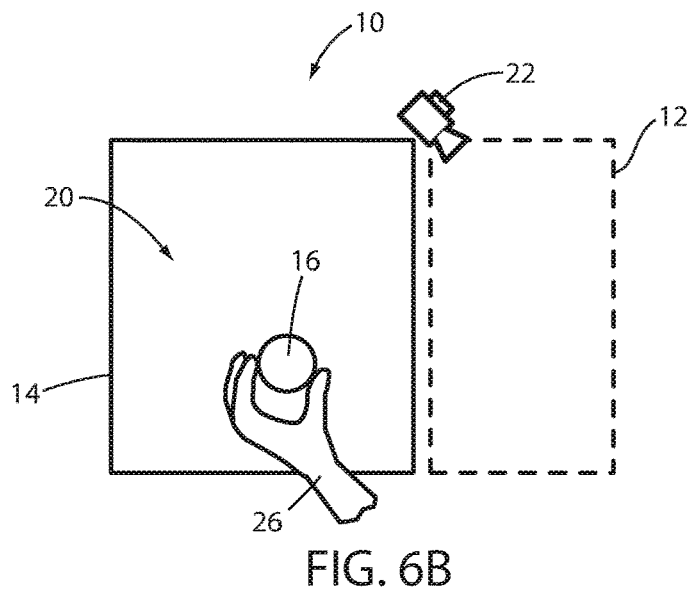
FIG. 6B is a schematic diagram demonstrating an interaction recognition process.
Figure 6C:
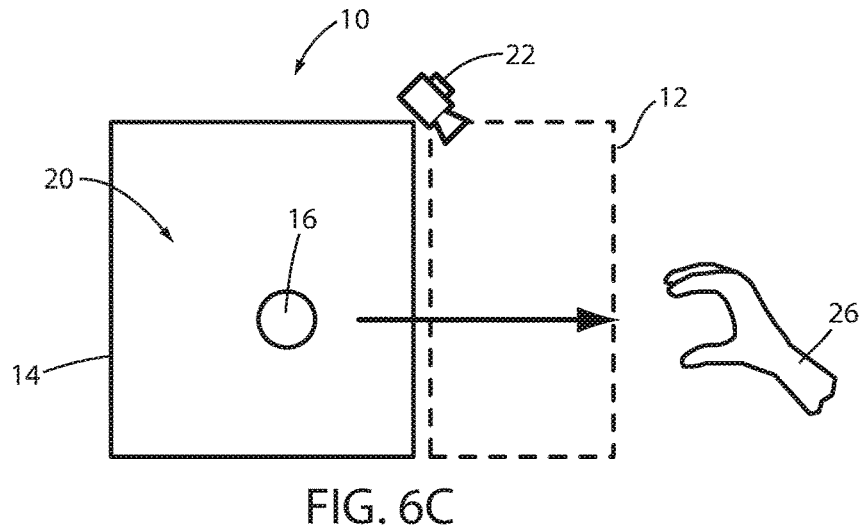
FIG. 6C is a schematic diagram demonstrating an interaction recognition process.

Referring now to FIGS. 6A-6C, an exemplary method of detection by the interaction recognition system 10 of a consumption or disposal of the object 16 is shown. The method discussed in FIG. 6 may be similar to that discussed in reference to FIG. 3. A main difference between these methods may be that the corresponding process completed in the operating volume 20 discussed in reference to FIG. 6 involves the consumption and/or disposal of the object 16. In contrast, the process applied to the object 16 in the operating volume 20 in reference to FIGS. 3 and 4 may not involve a consumption or disposal of the object 16 but rather a processing or storage in which the object 16 may be removed from the operating volume 20.

In reference to FIG. 6A, the hand 26 is shown in connection with the object 16 passing through the access region 12 to complete the insertion 32. FIG. 6B demonstrates the hand 26 in connection with the object 16 within the operating volume 20. Additionally, FIG. 6C demonstrates the withdrawal 62 of the hand 26 from the operating volume 20 via the access region 12. Based on the image data captured by the field of view 24 of the imaging device 22 in the access region 12, the system 10 may identify the interaction of the hand 26 in connection with the object 16 discussed in reference to FIGS. 6A-6C to infer that the object 16 has completed the insertion 32 into the operating volume 20.

Still referring to FIG. 6, in response to the insertion 32 of the object 16 to the operating volume 20, the interaction recognition system 10 may identify that the object 16 is pending a consumption process or has been disposed in the operating volume 20. For example, particularly in reference to the dishwasher 52, the object 16 may correspond to a quantity of detergent or a detergent pod that may be consumed by the appliance 14 during an upcoming wash cycle or process corresponding to the appliance 14. Based on identification of the object 16 in the image data captured by the imaging device 22, the system 10 may update a usage or inventory of the object 16 as being consumed or depleted. Similarly, if the appliance 14 discussed in FIG. 6 is a disposal or a trash receptacle, the system 10 may update an inventory of the identified object based on the placement of the object 16 into the disposal or waste receptacle. In this way, various consumable objects may be tracked by the system. Some additional examples of consumable objects that may be tracked by the system 10 may include water filters, lamps, food preservation pouches (Ethylene gas absorbers), odor removal pouches, etc.

Figure 7A:
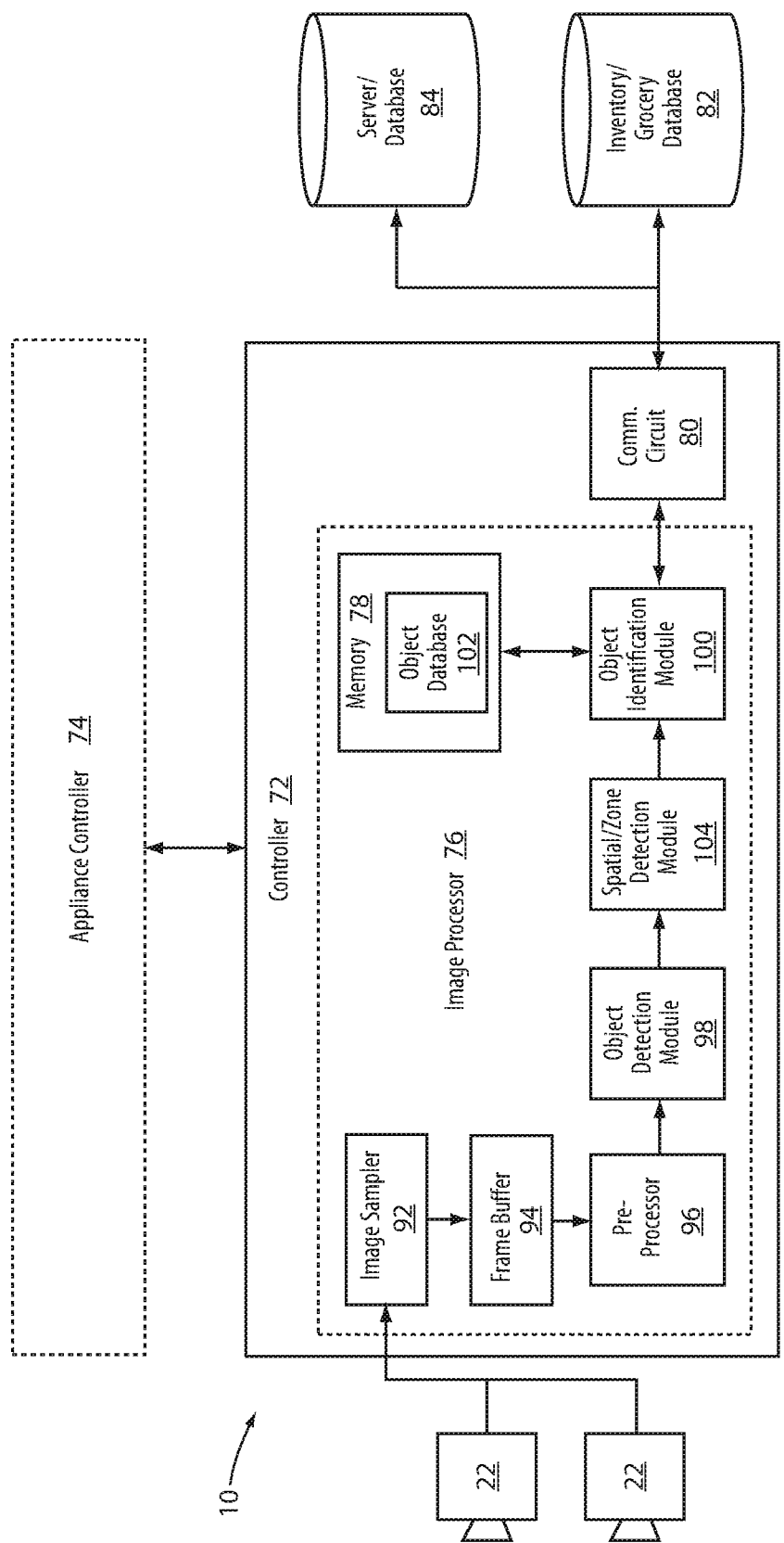
FIG. 7A is a block diagram of an interaction recognition system.
Figure 7B:
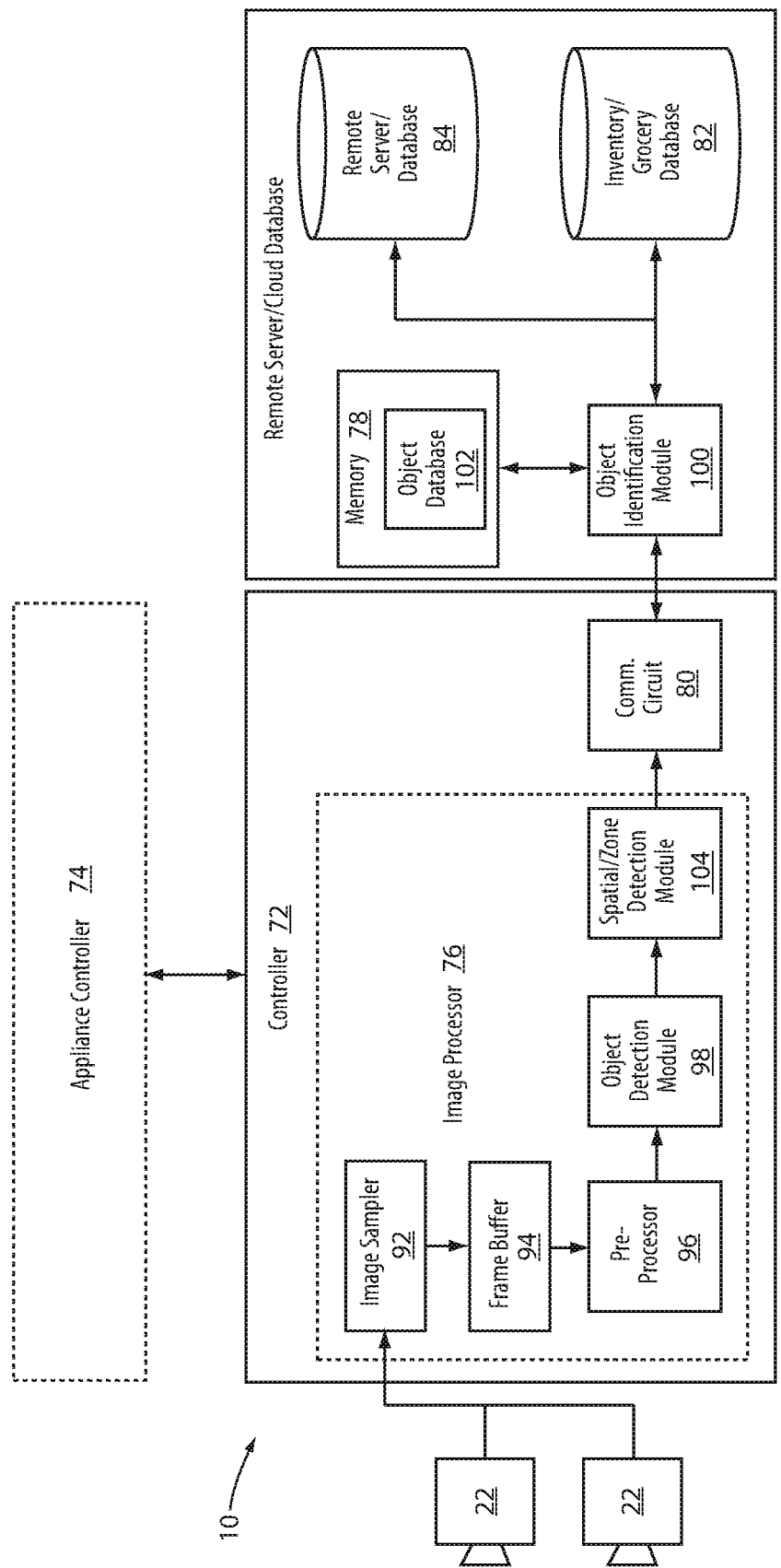
FIG. 7B is a block diagram of an interaction recognition system.

Referring now to FIGS. 7A and 7B, block diagrams of exemplary embodiments of the interaction recognition system 10 are shown. The system 10 may comprise a controller 72 which may be integrated with or in communication with an appliance controller 74. The controller 72 may comprise one or more processors and/or memory configured to complete the various processing steps and control procedures discussed herein. In an exemplary embodiment, the controller 72 may comprise an image processor 76 in communication with the at least one imaging device 22. The image processor 76 may correspond to one or more microprocessors, discrete logic controllers or a combination of analog and/or digital circuitry. The image processor 76 may comprise a memory 78 and a communication circuit 80.

The memory 78 may correspond to various forms of tangible or non-transitory machine-readable or computer-readable media. For example, the memory 78 may correspond to flash memory, random access memory (RAM), erasable programmable read only memory (EPROM), or other machine-readable media. The image processor 76 may store various image processing algorithms, control instructions, and additional information in the memory 78 to complete one or more of the processing tasks described herein.

The communication circuit 80 may correspond to a wired or wireless communication device through which the controller 72 may communicate with and/or access various forms of information. For example, the controller 72 may access or update an inventory or grocery database 82 via the communication circuit 80. The inventory or grocery database 82 may correspond to a remote or cloud based storage that may be accessible by a variety of devices to access the inventory and/or grocery database information as described herein. Additionally, the communication circuit 80 may further be in communication with an additional remote server or database 84 from which controller software updates, object recognition information, algorithms, object libraries, recipe libraries, and various additional information for use with the system 10 may be accessed.

Though discussed in reference to remote or cloud based databases, the databases 82 and/or 84 may also correspond to local storage provided in a memory of the controller 72. Additionally, in some embodiments, a portion of each of the databases 82 and 84 may be stored in the local memory while additional portions may be stored in the remote databases 82 and 84 in communication with the controller 72 via the communication circuit 80. The communication circuit 80 may utilize various forms of communication interfaces including, but not limited to, the following wireless communication protocols: 3G, 4G, Wi-Fi®, Wi-Max®, CDMA, GSM, and/or any suitable wireless communication protocol.

As discussed herein, the system 10 may be operable to complete various image processing and identification steps corresponding to the object 16 in connection with the hand 26 passing through the access region 12. Such detection, recognition, and/or identification may be completed by the image processor 76 by processing the image data received from the at least one imaging device 22. In order to process the image data, the image processor 76 may comprise a plurality of processing modules configured to improve or simplify the image data, detect the motion of the object 16, and/or determine an identity of the object 16. In this way, the image processor 76 may provide for the detection of the hand 26 and the determination of the identity, quantity, and/or proportion of the object 16.

In an exemplary embodiment, image processor 76 may comprise an image sampler 92. The image sampler 92 may gather a sequence of image frames from the image data received from the at least one imaging device 22. The sequence of image frames may be temporarily stored in a frame buffer 94. From the frame buffer 94, the image data from the image frames may be retrieved by a pre-processor 96. The pre-processor 96 may process the sequence of image frames from the image data to enhance the contrast, adjust a rotation, correct a boundary, and/or scale or crop the image data. The pre-processor 96 may accomplish such steps by processing the image data with a variety of enhancement techniques, including but not limited to, histogram equalization, image segmentation, filtering, etc.

Enhanced image data may be communicated from the pre-processor 96 to the object detection module 98. The object detection module 98 may process the enhanced image data corresponding to the one or more access regions 12 to detect a portion of the person's body or the hand 26 as described herein. Upon identification of the hand 26, the image data may be communicated to an object identification module 100. The object identification module 100 may process the image data to determine if the object 16 is in connection with the hand 26. If detected, the object identification module 100 may process the enhanced image to determine an identity, type, category, proportion, and/or quantity of the object 16.

In some embodiments, the image processor 76 may be operable to detect and process motion data for the hand 26 and/or the object 16 in the image data. For example, in an exemplary embodiment, the object detection module 98 may be operable to identify a motion vector of the object 16 and/or the hand 26. In this way, a kinematic relationship between the object 16 and the hand 26 may be identified by the image processor 76. Accordingly, the object 16 may be identified as being in connection with the part of the person's body in response to a motion vector of the object 16 being kinematically similar to a body motion vector of hand 26. The kinematic similarity may be identified in response to the object motion vector and the body motion vector being similar in direction and rate.

The object identification module 100 may utilize a variety of scanning methods and/or algorithms to determine the identity of the object 16. Such algorithms may include, but are not limited to, character recognition, feature extraction, clustering, pattern matching, neural network processing, optical character recognition (OCR), or various other recognition techniques. In some embodiments, the object identification module 100 may further be in communication with an object database 102. The object database 102 may comprise a library of features and/or characteristics for comparison to the enhanced image data by the object identification module 100 in order to determine the identity of the object 16. In this way, the system 10 may be operable to determine the identity of the object 16 as discussed herein.

Although the image processor 76 is demonstrated as being an integral component of the controller 72, the image processor 76 may correspond to a remote image processing system that may be in communication with the controller 72 via the communication circuit 80. In this way, the interaction recognition system 10 may communicate the image data to a remote image processor via the communication circuit 80 in order to determine the identity of the object 16 with the object identification module 100. Upon determination of the identity of the object 16 from the image data, the remote image processor may provide an indication of the identity and any other relevant information to the controller 72 via the communication circuit 80. Accordingly, though the interaction recognition system 10 is discussed in reference to specific examples, the functions described in reference to the system 10 may be completed in a variety of ways without departing from the spirit of the disclosure.

In some embodiments, the at least one imaging device 22 may correspond to a plurality of imaging devices or a stereoscopic imaging device. In this way the image processor 76 may also be operable to determine a position and proximity of the object 16 based on depth data gathered by the stereoscopic imaging devices. In such a configuration, the image processor 76 may comprise a spatial or zone detection module 104 configured to identify a position of the hand 26 and/or object 16 in the field of view 24 or the access region 12. Such positional information of the object 16 and/or the hand 26 may be beneficial in identifying or distinguishing a location of the hand 26 and/or object 16 relative to each of the access regions 12 and corresponding operating volumes 20 of the various appliances 14 discussed herein. Accordingly, the interaction recognition system 10 may correspond to a scalable system operable to suit a variety of applications. A stereoscopic system may also be used to estimate volume of an object 16 entering the operating volume 20 through the access region 12.

In some embodiments, the at least one imaging device 22 may correspond to an infrared imaging device, thermal imaging device, or a combination of thermal and conventional imaging devices. The thermal imaging device may correspond to a focal plane array (FPA) utilizing microbolometers as FPA sensors. Accordingly, the image data captured by the system 10 may comprise thermal image data and/or conventional image data in the visible light spectrum. In some embodiments, the system 10 may be operable to distinguish between a plurality of objects having a like visual appearance in the image, but differing temperatures. For example, in some embodiments, the system 10 may be operable to track an inventory of an object that is removed from the operating volume 20 at a cold temperature and replaced in the operating volume at a warm temperature. Accordingly, by utilizing the thermal imaging data, the system 10 may be operable to distinguish additional status information for the object 16.

Figure 8B:
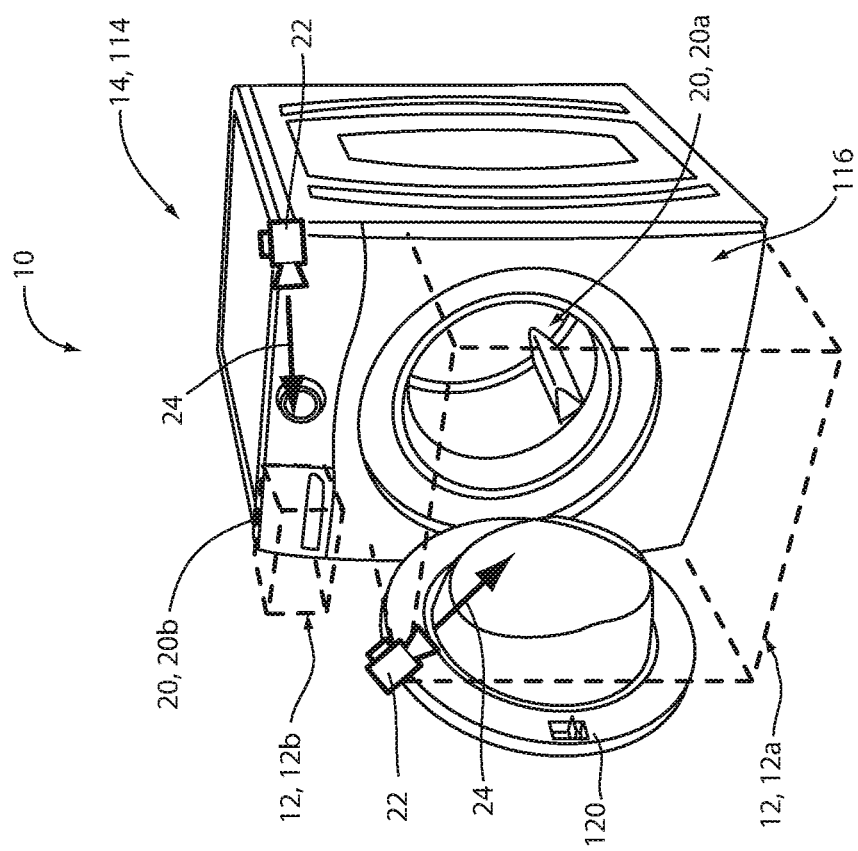
FIG. 8B is a projected view of an appliance comprising an interaction recognition system.
Figure 8A:
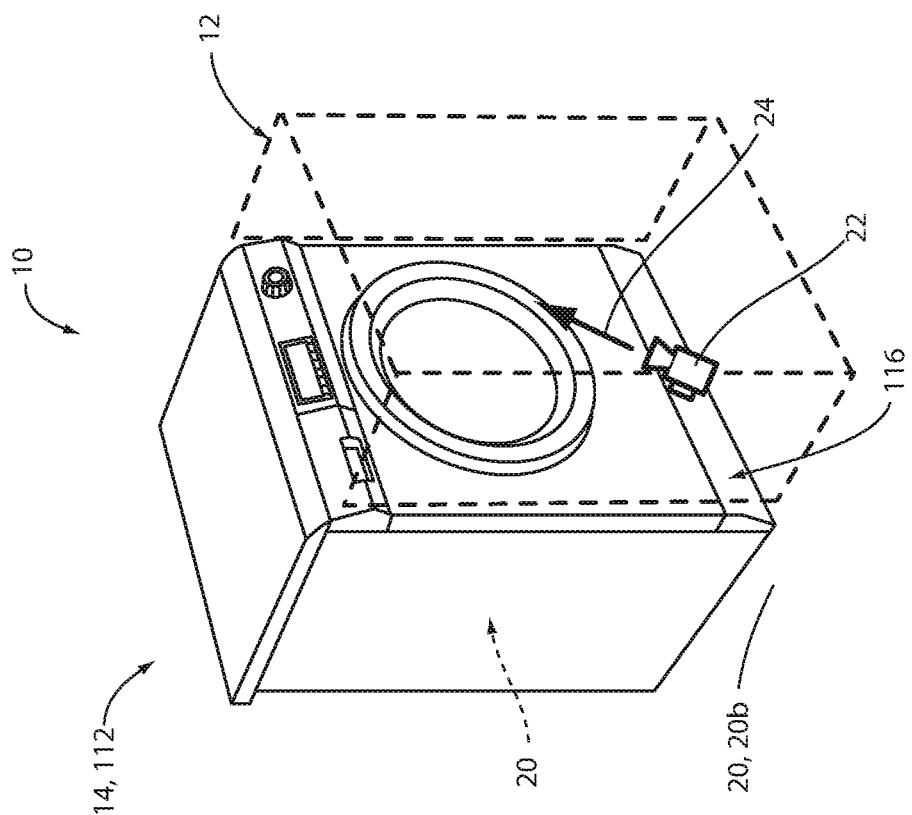
FIG. 8A is a projected view of an appliance comprising an interaction recognition system.

Referring now to FIGS. 8A and 8B, the interaction recognition system 10 is demonstrated configured to interact with a first laundry system 112 and a second laundry system 114. FIG. 8A demonstrates the first laundry system 112 comprising the imaging device 22 mounted to a lower portion of a front face 116 of a body 118 of the appliance 14. In this configuration, the imaging device 22 may be configured to capture image data in the field of view 24 corresponding to the access region 12.

In FIG. 8B, the second laundry system 114 is demonstrated comprising a plurality of imaging devices 22. The plurality of imaging devices 22 may correspond to a first imaging device 22a and a second imaging device 22b. The first imaging device 22a may be mounted on an access door 120 and configured to capture image data in the field of view 24 corresponding to a first access region 12a. Additionally, the second imaging device 22b may be mounted to an upper portion of the front face 116 of the body 118. In this configuration, the second imaging device 22b may be configured to capture image data in the field of view 24 including the second access region 12b. Though described as being mounted to the appliance 14, the at least one imaging device 22 may be mounted or otherwise located proximate the access region 12 of the appliance 14 such that the image data of the field of view includes information regarding the hand 26 and object 16 entering, exiting, or otherwise accessing the operating volume 20 or work surface 136.

The first access region 12a may correspond to a volumetric space defined by entrance to a first operating volume 20a. The first operating volume 20a may be configured to process the object 16 via a typical laundry operation wherein the object 16 undergoes the insertion 32 and removal 42. Accordingly, the system 10 may be configured to track a laundering process of the object 16 in response to the insertion 32 and the removal 42. In this way, the system 10 may identify a clean/dirty status, damp/dry status, as well as a variety of details or characteristics of the object 16 that may be utilized to set a wash or dry configuration. For example, a color, texture, clothing type, material type, etc. may be identified from the image data to set the wash or dry configuration for the object 16. Especially in the case of laundry, it may be typical for multiple objects 16 (or pieces of clothing) to be bunched or bundled together in the hand 26 or hands as they pass through the access region 12. Accordingly, the system 10 may be configured to identify multiple objects in connection with the hand 26 to support operation of the appliance 14 under such conditions.

The second access region 12b may correspond to a second operating volume 20b. The second operating volume 20b may be configured to receive the object 16 in the form of a consumable or disposable object. Accordingly, the system 10 may detect the insertion 32 and withdrawal 62 of the empty hand 26 to track or update a status of an inventory of the object 16 (e.g. laundry detergent). In this way, the interaction recognition system 10 may provide for monitoring one or more operating volumes 20 of an appliance 14 utilizing one or more imaging devices 22. Though discussed in reference to the first laundry system 112 and a second laundry system 114, the locations and configurations of the imaging devices 22 discussed in reference to FIGS. 8a and 8b may be applied to monitor the access regions 12 of various appliances 14 as discussed herein.

Figure 9B:
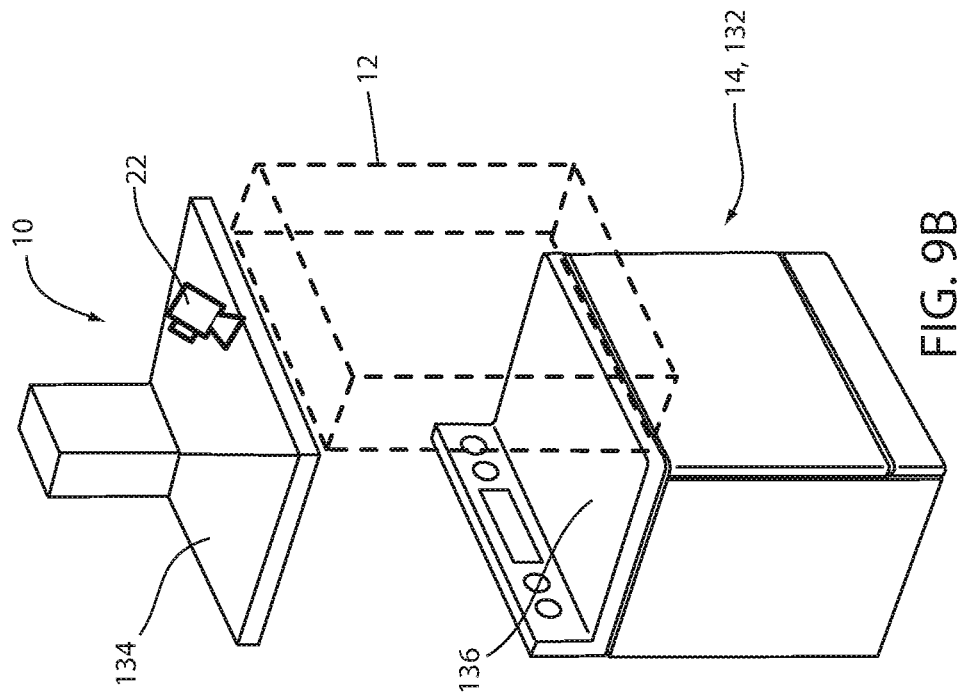
FIG. 9B is a projected view of an appliance demonstrating a work surface monitored by an interaction recognition system.
Figure 9A:
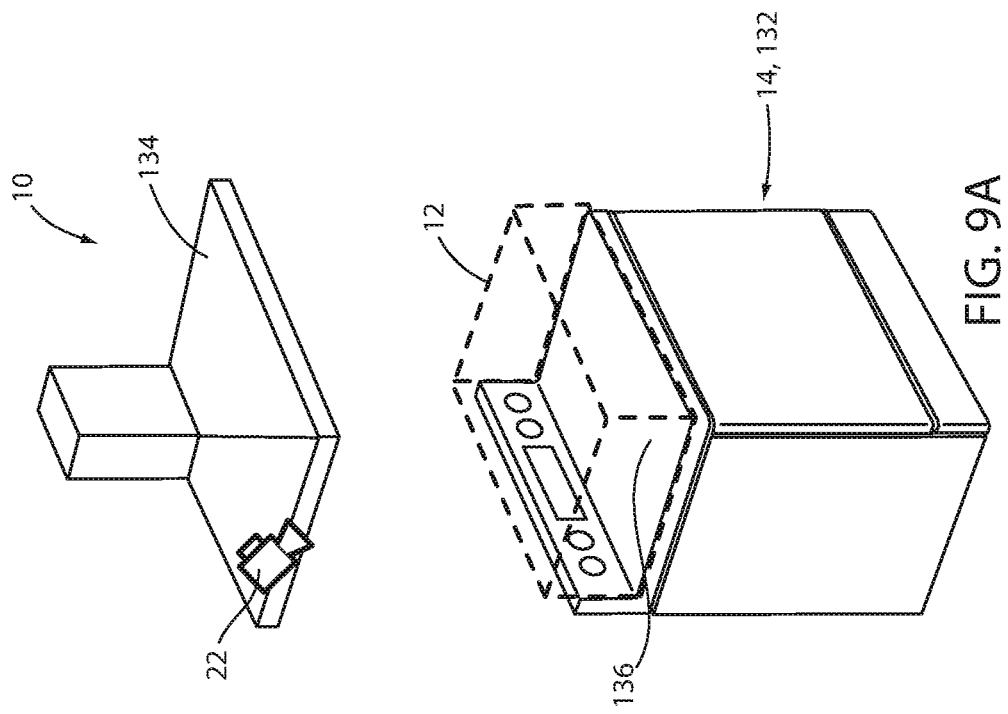
FIG. 9A is a projected view of an appliance demonstrating a work surface monitored by an interaction recognition system.

Referring to FIGS. 9A and 9B, the appliance 14 is demonstrated as a cooking apparatus 132 and a ventilation hood 134. The cooking apparatus 132 may correspond to a free standing range or cooktop and may comprise at least one access region 12. As demonstrated in FIG. 9A, the access region 12 corresponds to a region located adjacent to and/or above a work surface 136 of the cooking apparatus 132. In this example, the work surface 136 may correspond to an active work surface of the appliance 14 because the appliance actively interacts with and supplies heat energy to the work surface 136. In this configuration, the imaging device 22 may be configured to capture image data of the object 16 proximate to the work surface 136. In this way, the interaction recognition system 10 may be utilized to detect an interaction between the hand 26 and the object 16 approximate the work surface 136 to achieve similar results as discussed in reference to the operating volume 20.

FIG. 9B demonstrates an imaging device 22 configured to capture imaging data in an access region 12 located adjacent to a perimeter of the work surface 136. In this configuration, the recognition system 10 may be operable to detect the hand 26 in connection with the object 16 as it passes through the access region 12 in order update and/or identify a status of the object 16. Accordingly, the interaction recognition system 10 may be configured in various ways to detect an identity of the object 16 and update a status of the object 16 based on a detection of the hand 26 entering and/or exiting the access region 12. In the case of a work surface, additional user interaction related to the hand 26 can be monitored. Such interaction may include activities such as stirring of food, moving of pots/pans to a different location and adding or removing lids to cookware.

Figure 10A:
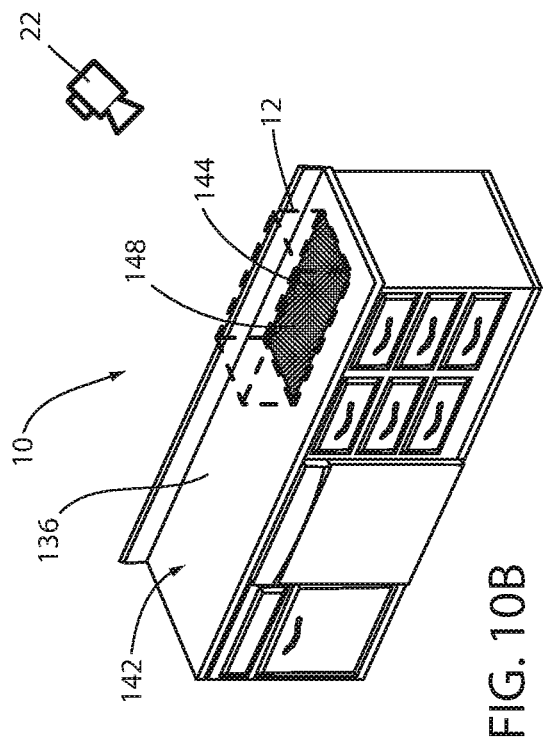
FIG. 10A is a projected view of a work surface demonstrating an interaction recognition system.
Figure 10B:
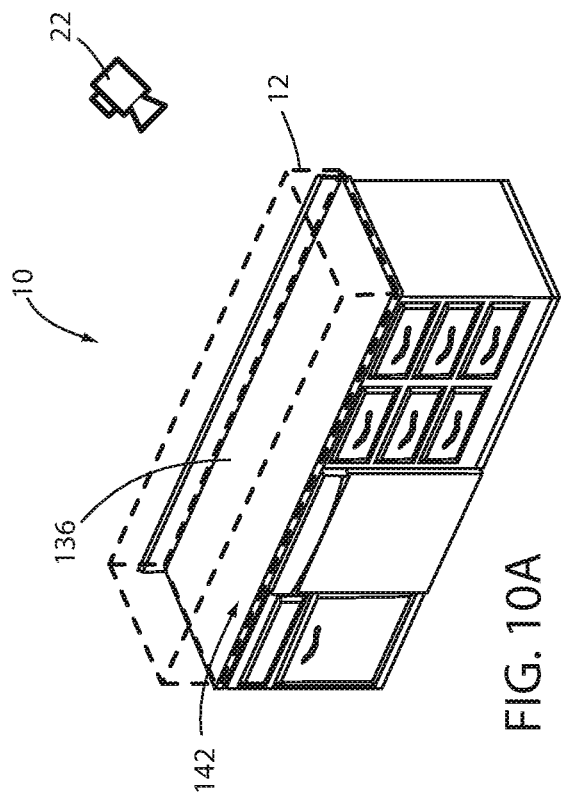
FIG. 10B is a projected view of the work surface demonstrated in FIG. 10A demonstrating a first region of interest of the work surface.
Figure 10C:
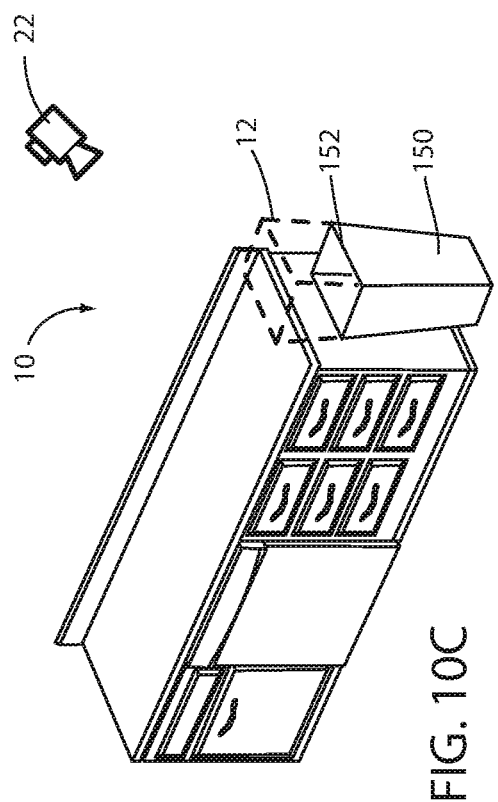
FIG. 10C is a projected view of a refuse container proximate the work surface further monitored by the interaction system in accordance with the disclosure.

Referring now to FIGS. 10A, 10B, and 10C, the interaction recognition system 10 is demonstrated as being configured to detect an interaction with a work surface 136 of a countertop 142, a region of interest 144 of the countertop 142, and a waste disposal container 150 respectively. FIG. 10A demonstrates the access region 12 of the system 10 located proximate to and above the work surface 136. In the examples of FIGS. 10A and 10B, the work surface 136 may correspond to an inactive work surface of the appliance 14 because the activity is unrelated to an appliance. Instead, the activity is related to manual actions completed by the hand 26. In this configuration, the system 10 may detect an interaction and status of the object 16 resulting from a manual procedure that may occur on the work surface 136. The system 10 may identify the status of the object 16 in response to the object 16 being detected entering the access region 12 in connection with the hand 26 and being removed from the work surface 136 by the hand 26. Similarly, in FIG. 10B, the region of interest 144 of the work surface 136 may correspond to a specific portion of the work surface 136 that may correspond to a foreign object resting on the countertop 142. For example, the foreign object may correspond to a cutting board 148. In this configuration, the system 10 may identify the region of interest 144 within the access region 12 to identify and track a status of the object 16 within the region of interest 144.

Finally, in reference to FIG. 10C, the waste disposal container 150 is shown demonstrating an access region 12 located above a receiving opening 152 formed by the waste disposal container 150. In this configuration, the system 10 may be operable to detect the object 16 in connection with the hand 26 entering the access region 12 above the receiving opening 152. In response to the hand 26 being withdrawn from the access region 12 without the object 16, the system 10 may infer that the object 16 has been disposed of. In response to the disposal of the object 16, the system may remove or update the inventory of the object 16 based on the disposal.

As described herein, the interaction recognition system 10 may be configured to identify various objects based on a detected interaction between the objects and a part or portion of a person's body. By focusing on the detection of the object in connection with the portion of the body, the system 10 may be operable to make various inferences to determine a status of the object. Such inferences may be specific to each appliance 14 with which the interaction recognition system 10 is utilized. In addition to the identification of the objects discussed herein, the interaction recognition system 10 may further be operable to detect various properties and/or characteristics of the object 16 in connection with a part of a body based on image data captured within an access region 12 of an appliance 14. Accordingly, the various embodiments of the system 10 discussed herein may provide for a flexible solution that may be utilized for identifying objects for inventory tracking, cooking and/or storage indications, generating automated grocery lists, generating recipes, cooking quality determinations, interacting with a user, and determining various processes and/or functions for automated operation of an appliance in accordance with the disclosure.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An object tracking system comprising:
an appliance comprising at least one operating volume and an access region through which the operating volume is accessed;
at least one imager configured to capture image data in a field of view comprising the access region; and
a controller in communication with the imager, wherein the controller is operable to:
identify a physical object in connection with the part of the person's body;
identify whether or not the physical object is in connection with at least one part of a person's body as the part of the person's body enters or exits the access region based on the image data; and
based on the identification of the physical object in connection with the part of the person's body, determine an action for the physical object based on one or more characteristics of the physical object indicated in the image data.

2. The system according to claim 1, wherein the action is determined by the controller in response to the part of the person's body entering or exiting the operating volume in connection with the physical object based on the image data captured in the access region.

3. The system according to claim 1, wherein the controller is operable to initiate the action to provide feedback to a user relating to the physical object.

4. The system according to claim 3, wherein the controller is operable to determine an input to the controller from the user in response to the action.

5. The system according to claim 4, wherein input from the user comprises a vocal communication or a gesture.

6. The system according to claim 1, wherein the action comprises voice feedback to a user relating to the physical object.

7. The system according to claim 1, wherein the action comprises selective lighting of at least a portion of a shelf or drawer to provide feedback to a user relating to the physical object.

8. The system according to claim 1, wherein the operating volume comprises a processing region of the appliance in which the physical object is processed, stored, or consumed.

9. The system according to claim 1, wherein the controller is configured to determine the action for the physical object in response to a detection of the physical object entering or exiting the operating volume.

10. A method of tracking an object utilized in connection with an appliance comprising the steps of:
capturing image data in an access region adjacent to an operating volume of the appliance;
detecting at least one part of a person's body in the access region of the operating volume based on the image data;
determining that the object is in connection with the part of the person's body;
determining that the object in connection with the part of the person's body is being inserted or withdrawn from the operating volume;
determining an action for the object in connection with part of the person's body based on one or more characteristics of the object indicated in the image data; and
in response to determining an action for the object, initiating the action to provide feedback to a user relating to the object in the access region.

11. The method according to claim 10, wherein the action comprises a voice message or selective lighting.

12. The method according to claim 11, wherein the voice message further comprises an indication of an optimal storage location for the object.

13. The method according to claim 10, wherein the method further comprises determining an input to a controller in communication with an imager from the person's body in response to the action.

14. The method according to claim 13, wherein determining an input from the person's body further comprises determining a gesture.

15. The method according to claim 13, wherein determining an input from the person's body further comprises determining a voice response.

16. An object tracking system comprising:
an appliance comprising at least one operating volume and an access region through which the operating volume is accessed;
at least one imager configured to capture image data in a field of view comprising the access region; and
a controller in communication with the imager, wherein the controller is operable to:
detect at least one part of a person's body entering or exiting the access region based on the image data;
identify an object based on the image data;
identify that the object is in connection with the part of the person's body upon entering or exiting the operating volume based on the image data;
determine that the object in connection with the part of the person's body is being inserted or withdrawn from the operating volume; and
initiate an advanced interaction for the object in response to the entering or exiting based on one or more characteristics of the object indicated in the image data wherein the advanced interaction provides feedback to a user relating to the object.

17. The system according to claim 16, wherein the appliance corresponds to a food storage appliance and the advanced interaction comprises selective lighting of at least a portion of the appliance to indicate an optimal storage location for the object.

18. The system according to claim 16, wherein the appliance corresponds to a food storage appliance and the advanced interaction comprises a voice message inquiring about information relating to the object.

19. The system according to claim 18, wherein the controller is further operable to determine an input to the controller from the user in response to the voice message.

20. The system according to claim 19, wherein the input from the user comprises a gesture or a vocal communication.

* * * * *